United States Patent [19]
Osborn et al.

[11] Patent Number: 5,775,166
[45] Date of Patent: Jul. 7, 1998

[54] VEHICLE SHIFTER

[75] Inventors: Charles Osborn, Spring Lake; Robert M. Medema, Muskegon; Andrew K. Ruiter, Spring Lake, all of Mich.

[73] Assignee: Grand Haven Stamped Products, Div. of JSJ Corp., Grand Haven, Mich.

[21] Appl. No.: 681,766

[22] Filed: Jul. 29, 1996

Related U.S. Application Data

[60] Provisional application No. 60/003,339, Aug. 3, 1995.

[51] Int. Cl.[6] .................. B60K 20/02; F16H 59/04; G05G 5/08
[52] U.S. Cl. .................. 74/475; 74/527; 192/4 A
[58] Field of Search .................. 74/475, 520, 527; 192/4 A

[56] References Cited

U.S. PATENT DOCUMENTS

| | | | |
|---|---|---|---|
| 2,890,581 | 6/1959 | Lewis | 70/248 |
| 2,915,681 | 12/1959 | Troy | 317/123 |
| 3,939,940 | 2/1976 | Sasabe et al. | 180/82 |
| 3,941,008 | 3/1976 | Cambria . | |
| 4,246,989 | 1/1981 | Kohler | 192/4 A |
| 4,880,092 | 11/1989 | Kito et al. | 192/4 A |
| 4,905,802 | 3/1990 | Gotoh | 192/4 A |
| 4,930,609 | 6/1990 | Bois et al. | 192/4 A |
| 4,932,493 | 6/1990 | Sakurai et al. | 180/271 |
| 4,966,262 | 10/1990 | Mieczkowski | 192/4 A |
| 4,979,783 | 12/1990 | Johnson . | |
| 5,018,610 | 5/1991 | Rolinski et al. | 192/4 A |
| 5,129,494 | 7/1992 | Rollinski et al. | 192/4 A |
| 5,167,308 | 12/1992 | Osborn | 192/4 A |
| 5,181,592 | 1/1993 | Pattock | 192/4 A |
| 5,211,271 | 5/1993 | Osborn et al. | 192/4 A |
| 5,272,458 | 12/1993 | Hoffman et al. | 335/179 |
| 5,402,870 | 4/1995 | Osborn | 192/4 A |
| 5,494,141 | 2/1996 | Osborn et al. | 192/4 A |

FOREIGN PATENT DOCUMENTS

| | | |
|---|---|---|
| 1203756 | 4/1986 | Canada . |
| 0246353 | 11/1987 | European Pat. Off. . |
| 0300268 | 1/1989 | European Pat. Off. . |
| 0347150 | 12/1989 | European Pat. Off. . |
| 0400727 | 12/1990 | European Pat. Off. . |
| 625656A1 | 11/1994 | European Pat. Off. . |
| 3943011 | 6/1990 | Germany . |
| 4005590A1 | 8/1991 | Germany . |
| 176253 | 11/1984 | Japan . |
| 23427 | 2/1985 | Japan . |
| 60270 | 2/1992 | Japan . |

*Primary Examiner*—Rodney H. Bonck
*Assistant Examiner*—Troy Grabow
*Attorney, Agent, or Firm*—Price, Heneveld, Cooper, DeWitt & Litton

[57] ABSTRACT

A vehicle transmission shifter having a locking mechanism for controlling the shifting of a lever for an automatic transmission responsive to the condition of a vehicle. A locking member is provided to lock into a detent member movable with the shifting lever and which detent member controls the shifting of the gears in the transmission. The position of the locking member is controlled by an electrical module, the energization of which is controlled by a condition of the vehicle and the actuation of a switch in the handle of the shifting lever. Preferably the detent member which includes a plurality of gear position notches is an elongated member movable in a linear direction to provide a low profile shifter. In a preferred embodiment a novel module detent member sub-assembly is provided for use on various shifter mechanisms. Also in one embodiment the movement of the detent member is sensed so as to produce electrical signals for controlling an electronically operated transmission.

31 Claims, 12 Drawing Sheets

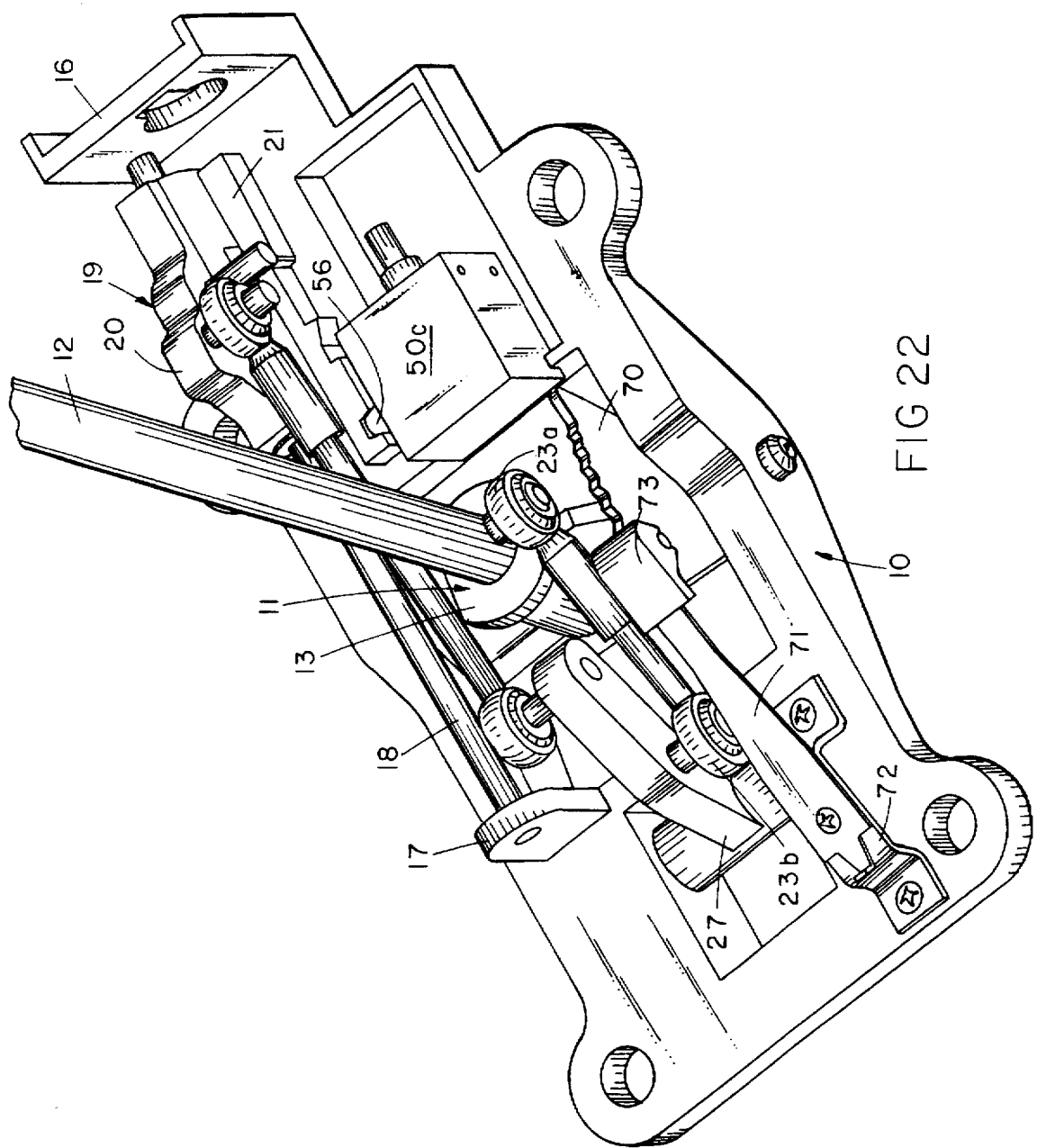

VEHICLE SHIFTER

CROSS-REFERENCE TO RELATED APPLICATIONS

This application claims priority under 35 U.S.C.§119(e) on U.S. Provisional Application 60/003,339 entitled "Vehicle Shifter" filed on Aug. 3, 1995 by Charles (NMI) Osborn.

BACKGROUND OF THE INVENTION

This relates generally to a locking mechanism for controlling the shifting of a lever for an automatic transmission, and more particularly, for such locking mechanism for locking the shift lever in a "PARK" position against rotation to other gear positions. More specifically, this invention relates to such a shifter which is responsive to the condition of a vehicle such as the application of the brakes of the automotive vehicles and also to the actuation of a switch mounted on or in the handle portion of the shift lever. More specifically, this invention relates to a low profile shifter for a vehicle. In addition, this invention relates to a module/detent member sub-combination useful on various shifter mechanisms.

As in the above identified patent application and patent, the object of locking the shifting lever in the park position unless the brake is applied is achieved by providing an electrically operated control module having a movable locking member, movable between a locking position and a nonlocking position. In addition to the control module being controlled by the application or nonapplication of the brakes of the vehicle on which the shifter is mounted it is also controlled by the actuation of a switch mounted in the handle of the shifter. Therefore, when the brakes are not applied or the switch is not actuated the locking member is urged to locked position. When the brakes are applied and when a switch mounted in the end of the shift lever is actuated, the locking member is moved to an unlocked position at which time the driver can actuate the shift lever from a park position to other gear positions.

In accordance with one concept of our invention, the pawl which is normally actuated by the driver of the vehicle is completely eliminated. This is accomplished by providing a movable detent member which includes a plurality of notches. The detent member moves with the shift lever. It is locked in position by a locking member which is actuated by a control module which is controlled by a driver applying the brakes of the vehicle whereby when the brakes are not applied and the handle switch is not actuated the locking member is in the locked position and when the brakes are applied and the handle switch is actuated the locking member is urged to an unlocked position.

In accordance with this invention the actuator for the transmission, be it a cable, rod or electronic control, is operatively connected to the detent member the movement of which out of "PARK" is restricted or unrestricted by the control module. The control module includes an electrical coil and a locking member movable in response to the energization of the coil, such energization being responsive to the application of the brakes and the actuation of the switch mounted in the handle of the shift lever. The control module preferably includes an actuator member provided for moving the locking member to release the locking member from locking position in the "PARK" notch. Such actuator member is operatively connected to the locking member through a mechanical advantage mechanism, preferably a toggle joint.

A low profile for the shifting mechanism is provided by the control module arranged to lay in a horizontal position whereby the locking member can engage a low profile movable detent member which preferably is movable along a linear path. This path is controlled by providing a guide such as a rod or guide block on which the detent member slides.

Also in accordance with our invention we provide a shifter mechanism utilizing structure as disclosed above but different in design for controlling transmissions with electronic signals.

Having briefly described the concepts of our invention, the following drawings with a more detailed description will serve to more clearly and specifically explain the concepts and principals of the invention.

BRIEF DESCRIPTION OF THE DRAWINGS

FIG. 22 is a rear, top perspective of another modification of this invention.

DESCRIPTION OF THE PREFERRED EMBODIMENTS

Figure 1:
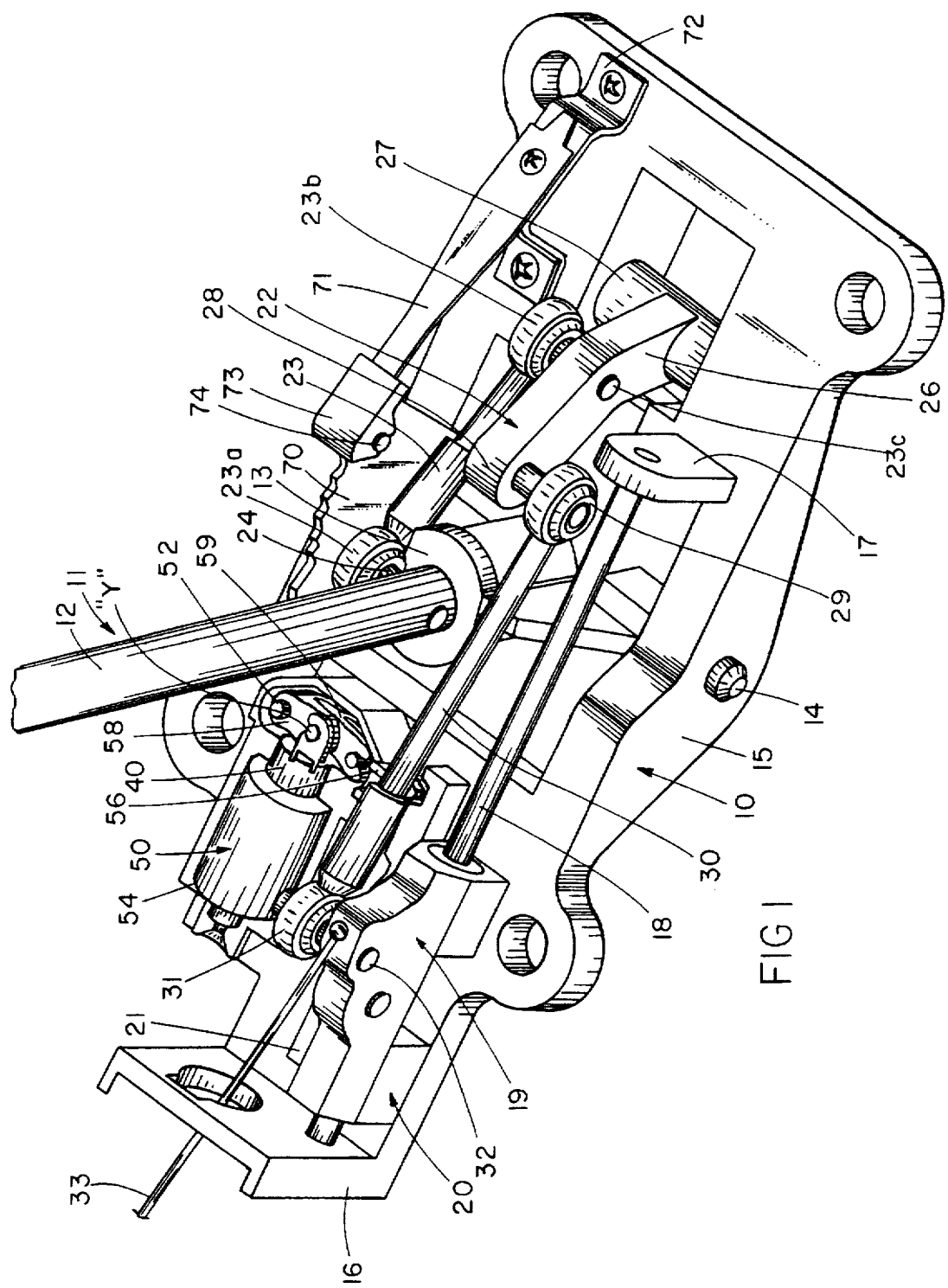
FIG. 1 is a top, side-elevational perspective view of one embodiment of this invention.
Figure 2:
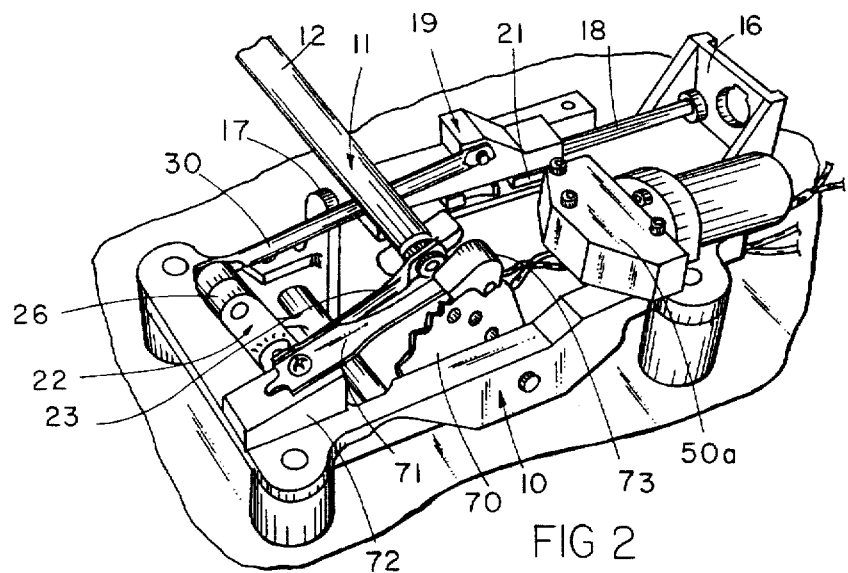
FIGS. 2–5 are side, top perspective views of the embodiment of FIG. 1 but disclosing a slightly different shaped control module.
Figure 3:
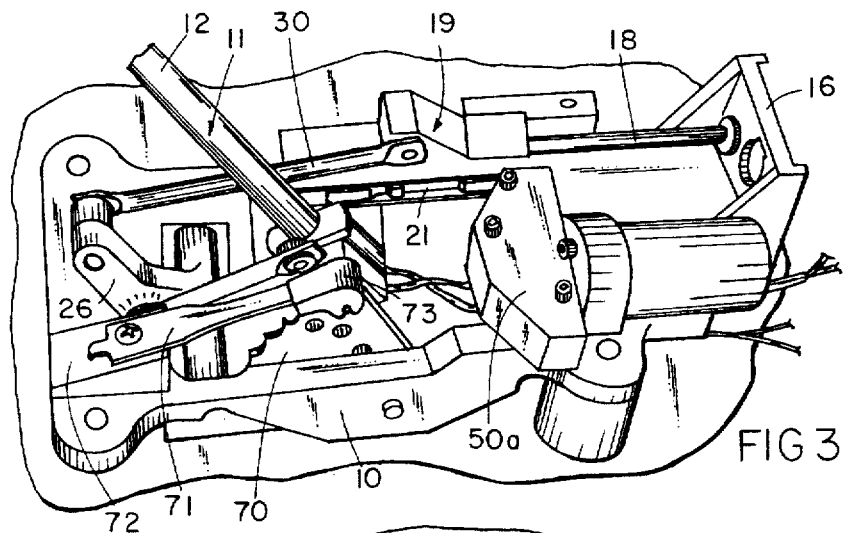
Figure 4:
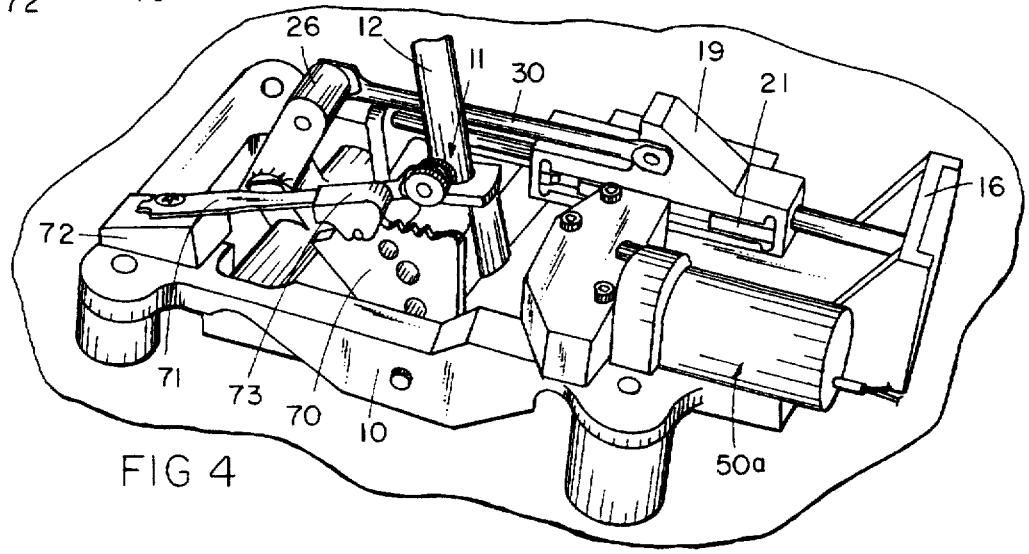
Figure 5:
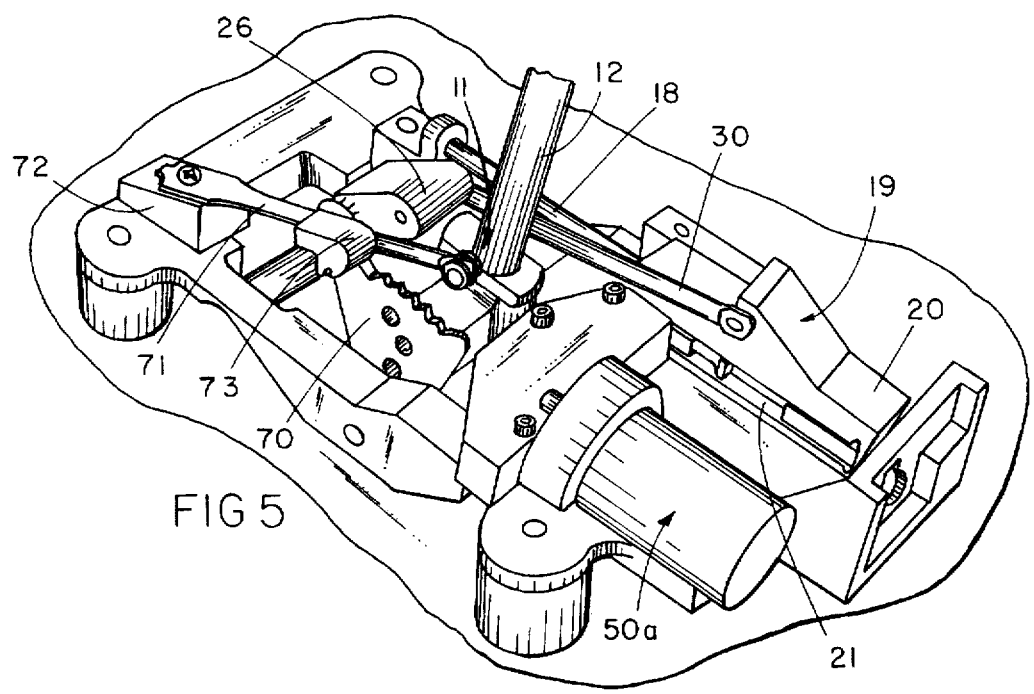
Figure 6:
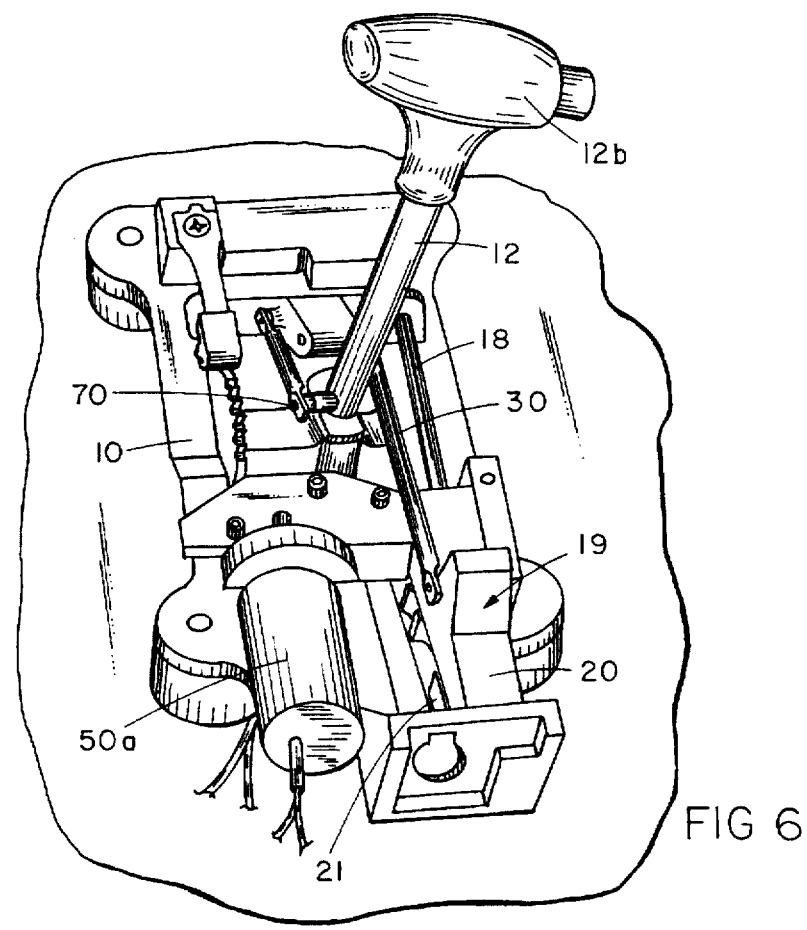
FIG. 6 is a front, top perspective view of the shifter mechanism of FIGS. 2–5.

Referring to the drawings and particularly FIGS. 1–8, reference numeral 10 designates a base which can be constructed of metal or plastic, preferably plastic. A shift lever assembly 11 including the shift lever 12 and the base 13, is pivotally mounted on base 10 by means of the shaft 14 extending through the sides 15. The upstanding support members 16 and 17 extend upwardly from the base 10 and support the guide 18 which in this embodiment is a guide rod for slidably supporting the detent assembly 19 which includes the block 20 to which is attached or integrally formed therewith the detent member 21. Thus the detent assembly including detent member 21 is slidable on the guide rod 18.

Detent assembly 19 is operatively connected to the shift lever assembly 11 by a mechanism including the stroke multiplier assembly 22 which includes the rod 23 pivotally connected at one end 23a to the shift stick 12 by means of the pivot pin 24. The other end 23b of rod 22 is pivotally connected to the arm 26 by pivot pin 23c. Arm 26 is pivotally connected at one end by pivot pin 27 to the base 10 and at the other end 28 is pivotally connected to one end 29 of link rod 30. The other end 31 of link rod 30 is pivotally connected by pin 32 to the detent assembly 19.

It should be evident from the drawings as disclosed in FIGS. 1–6 that the stroke multiplier assembly 22 is provided to multiply the pivotal movement of lever assembly 11. Such movement is translated to the sliding movement of the detent assembly 19 so that the detent member 21 is slidable a proper distance horizontally along the base 10 to meet the stroke requirements for the transmission to which cable 33 is attached. This arrangement of the stroke multiplier assembly 22 can be modified to meet the stroke requirements for any specific transmission which is actuated by a cable or rod 33 connected to the top of the detent block 20.

Figure 13:
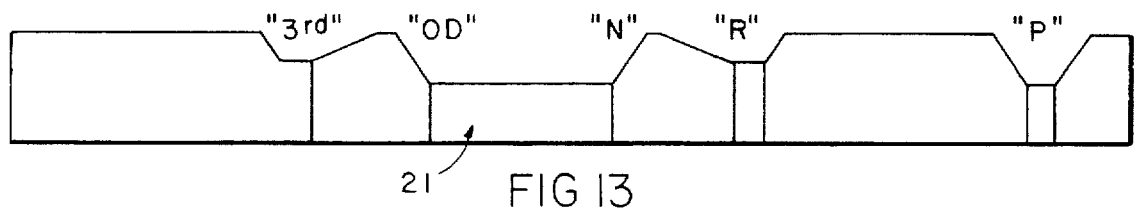
FIG. 13 is an outline of the notches of a typical detent member as utilized in the shifter mechanisms of FIGS. 1–11.
Figure 14:
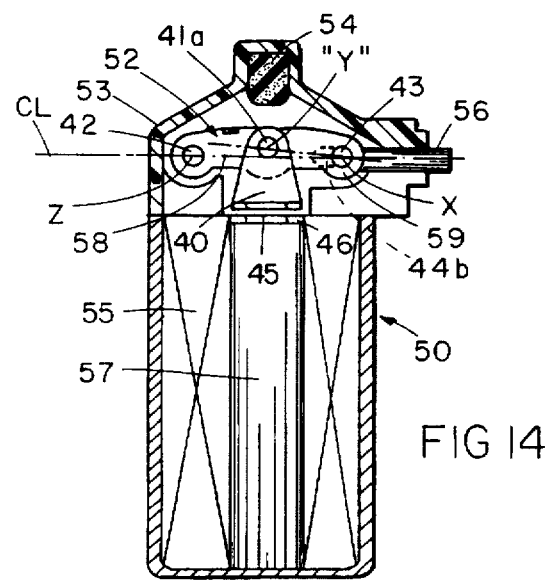
FIG. 14 is a figure from U.S. patent application Ser. No. 08/331,358 (now U.S. Pat. No. 5,494,141 previously referred to, and incorporated in this application so as to illustrate the type control module preferably utilized in this invention.

A module 50 like that described in application Ser. No. 08/331,358, or U.S. Pat. No. 5,402,870, which are hereby incorporated by reference, is mounted at the side of the detent member 21 in a horizontal position and is stationary with respect to the movable detent member 21. Module 50 controls the position of its pin 56 which in a locked position extends into a "PARK" notch "P" (FIG. 13) of the detent member 21. The position of the pin 56 is controlled by the magnetic attraction or repelling of the toggle linkage 52, which determines the locked or the unlocked position of the pin 56. As best disclosed in FIG. 14, toggle linkage 52 is mounted in housing 53 and comprises the three links 58, 59, and 40, all of which are pivotally connected together at one of their ends on the pivot pin 41a about the axis "Y." The other end of link 58 is pivoted on the pin 42 about the fixed axis "Z." The other end of link 59 is pivotally mounted by the pivot pin 43 to the locking member pin 56 for pivotal movement about the axis "X." The ends of pin 43 are slidable in the groove 44b. In the locked position of locking member 56, the two axes "X" and "Z" are substantially on a center line "CL" with the axis "Y" located slightly above center line "CL." The distance of the axes "Y" spaced above the center line "CL" is governed by the bottom end 46 of link 40 abutting the top end of the coil 55 of the module 50. This distance is selected to provide the proper restraining force exerted by the toggle unlocking member 56, it being understood that as the axis "Y" moves away from the center line "CL," the amount of force required to move the locking pin out of the locked position substantially decreases. Therefore the slight spacing of axis "Y" above the center line "CL" is selected so that the restraining force on pin 56 prevents the driver from displacing the pin toward the unlocked position when the brakes are not applied and a gear selector switch 61 (FIG. 15) located in the handle 12b (FIG. 6) is not actuated. In other words, as disclosed by the circuit of FIG. 15, gear selector switch 61 actuated by the operator of the vehicle and brake switch 62 must both be closed to energize the coil 55 of the module 50. When in "PARK" position magnet 45 which has a south pole is normally attracted to core 57 when the coils 55 are de-energized.

Figure 15:
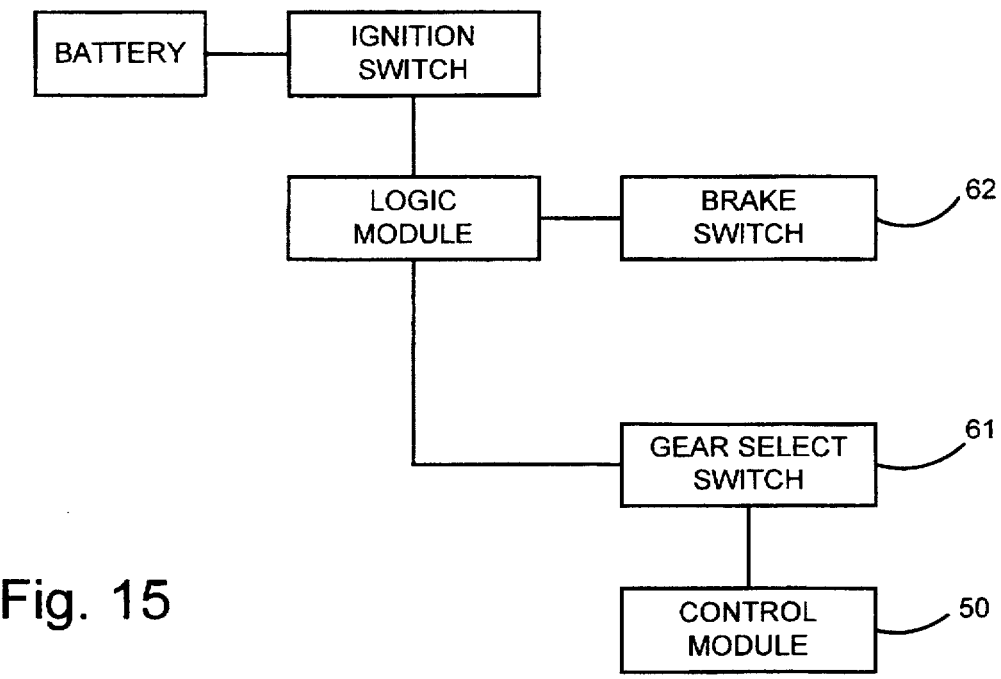
FIG. 15 is a circuit diagram for controlling the energization of the coil of the control module of FIGS. 1–11.
Figure 17:
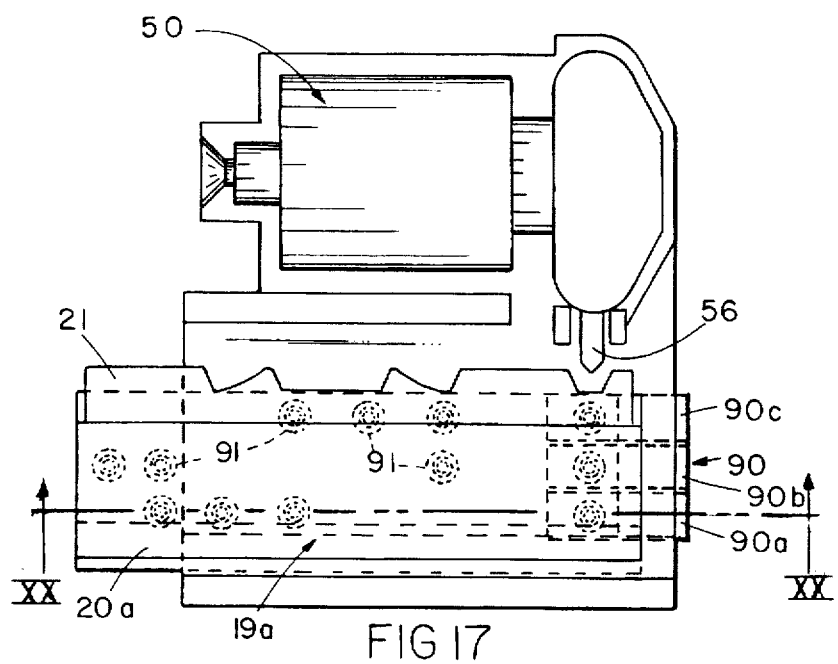
FIG. 17 is a plan view of a sketch of a shifter position switch assembly for generating signals to control an electronically controlled transmission utilizing the shifter mechanism of FIG. 12.
Figure 18:
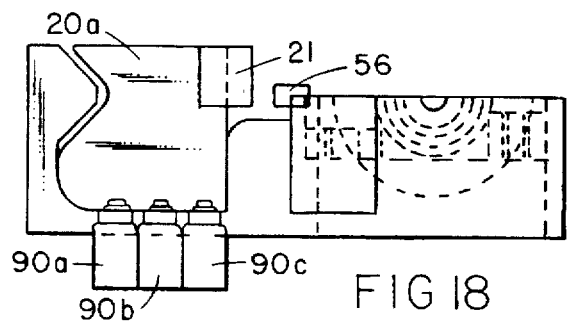
FIG. 18 is an end elevational view of the shifter position switch assembly of FIG. 17.
Figure 19:
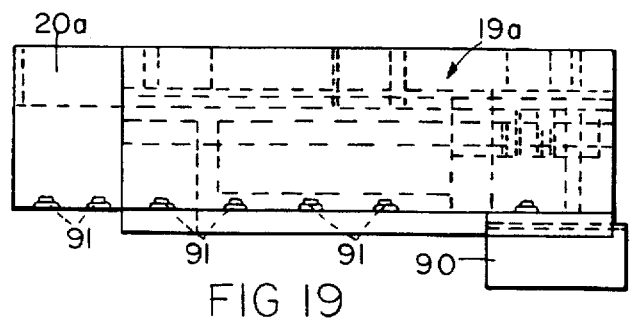
FIG. 19 is a side-elevational view of the shifter position switch assembly of FIG. 17.
Figure 20:
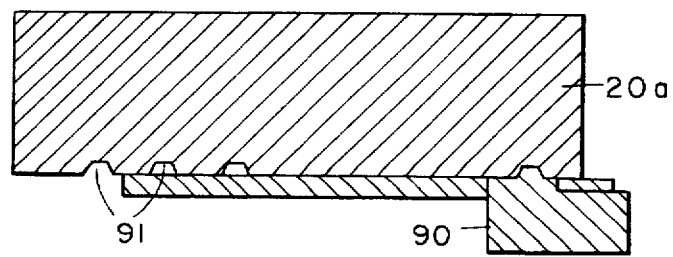
FIG. 20 is a cross-section taken along the plane XVIII-XVIII of FIG. 17.
Figure 21:
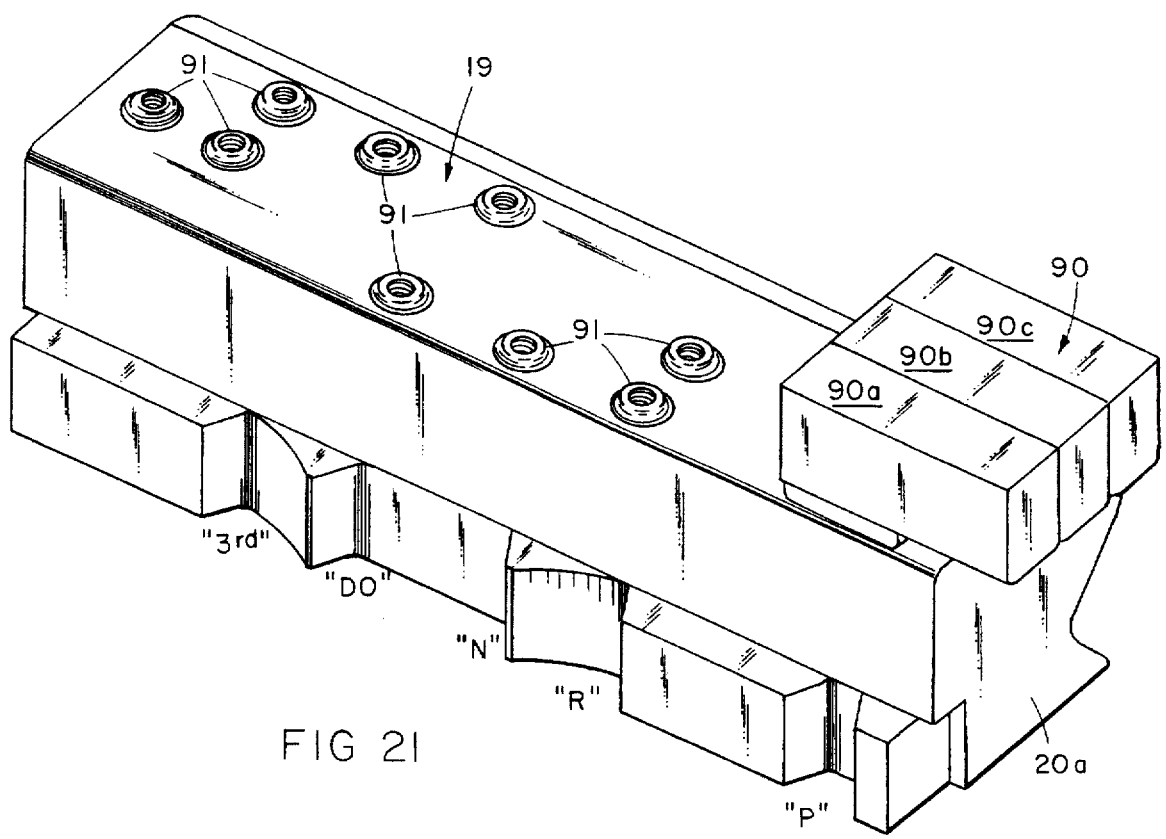
FIG. 21 is a bottom, side-elevational view of a portion of the assembly of FIG. 17.

FIG. 15 discloses a block diagram which includes a "Battery" which provides the power for the vehicle, an "Ignition Switch" which turns the power "on" and "off," a "Logic Module" that receives signals from the "Brake Switch" 62 and from other well known sources within a vehicle. The "Logic Module" along with the "Gear Selector Switch" 61 controls the energization of the coil 55 of the "Control Module" 50 so as to control the "Control Module" as set forth above. All of this is well within the skill of one in the art.

When coil 55 is energized core 57 becomes a south pole, i.e., like that of magnet 45. This results in core 57 repelling the south pole of the magnet 45 embedded in the end of the link 40. The link 40 is thus forced upwardly to a the position against the bumper 54 which has an elastomeric surface to provide a soft contact and thus reduces any clicking noise which might result when the toggle joint 52 reaches the upper position. When forced upwardly the toggle joint 52 pulls locking member pin 56 substantially out of the "PARK" (P) notch permitting the shift lever 12 (See FIG. 13) to be shifted to the reverse "R" position and the neutral "N" and overdrive "OD" positions. It will be noted that the dwells of the neutral "N" and overdrive "OD" positions are identical to the dwell of the park "P" position. When in neutral "N" and drive positions, the "Logic Module" eliminates the requirement for the brake switch to be actuated for energizing the coil 55 of module 50. However, actuation of the handle or gear selector switch 61 located in knob 12b (FIG. 6) is still required to energize coil 55. Therefore, to shift from "OD" actuation of switch 61 in knob 12b is required before the shifting lever can be shifted to the notch of the third gear notch "3RD."

In order to give a feel to the shifting of the shift lever 12 a so-called rooster comb 70 is provided which is directly connected to the shift lever assembly 11 so that it moves as the shift lever is pivoted about the axle 14. A leaf spring 71 attached to the bracket 72, which is in turn is secured to the base 10, has a roller assembly 73 attached to its end. This roller assembly 73 includes a roller 73a (FIG. 8) pivotable on the pin 74 and engaging the undulations of the rooster comb 70.

Figure 8:
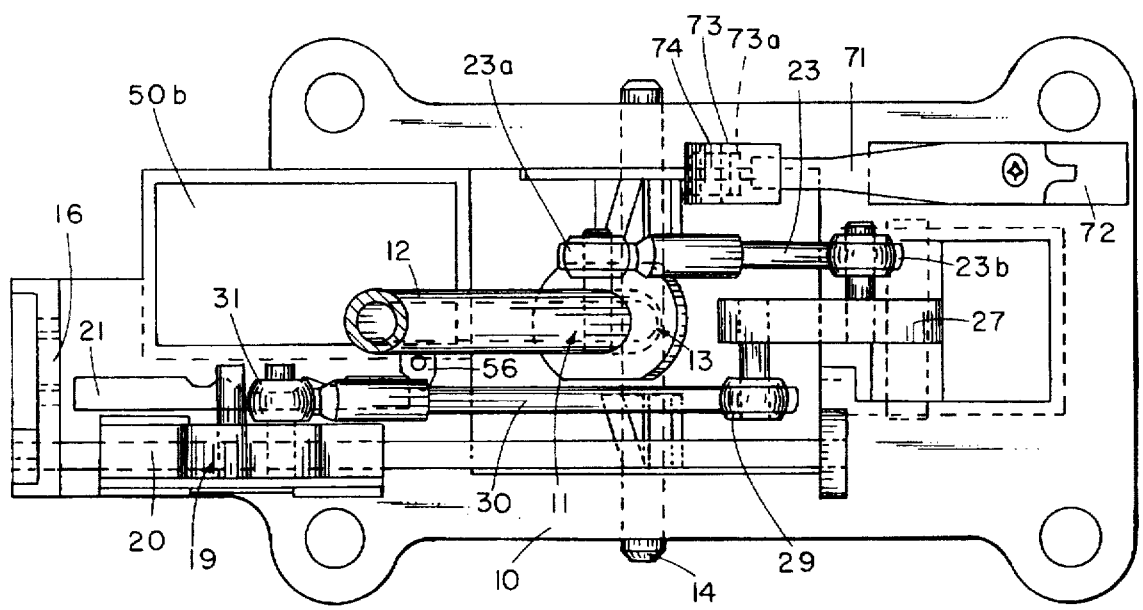
FIG. 8 is a plan view of the shifter mechanism of FIG. 7.
Figure 7:
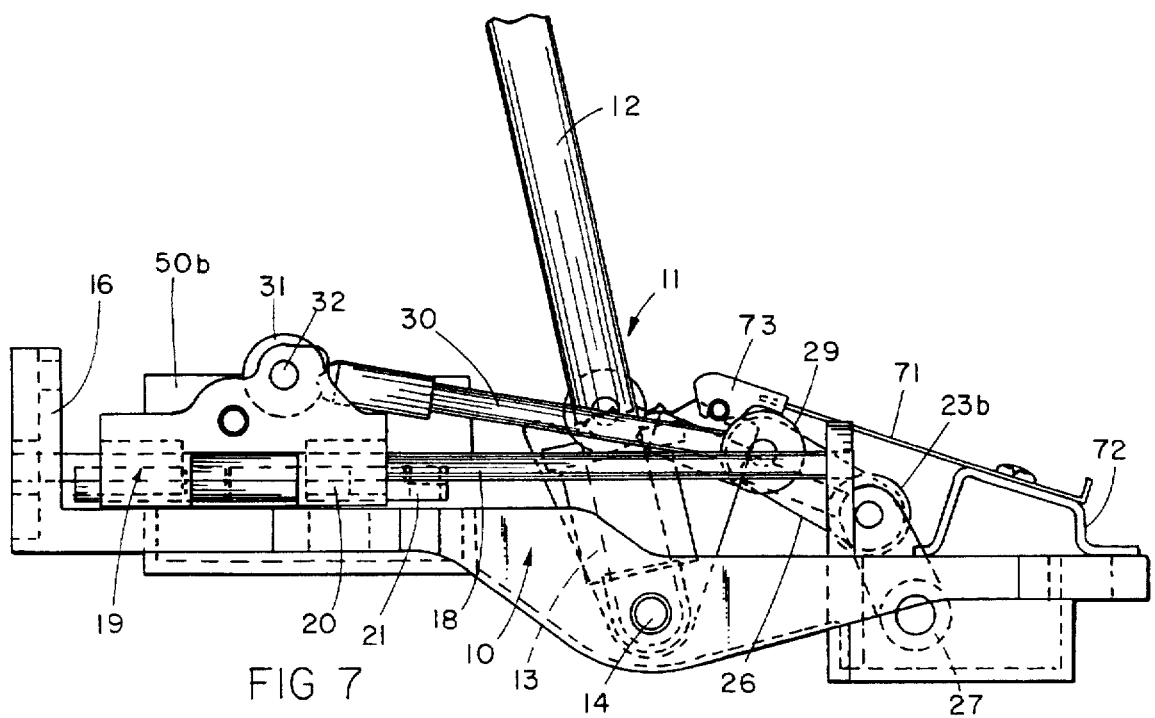
FIG. 7 is a side-elevational view of the shifter mechanism of FIGS. 1–6 showing the control module enclosed within a housing.
Figure 9:
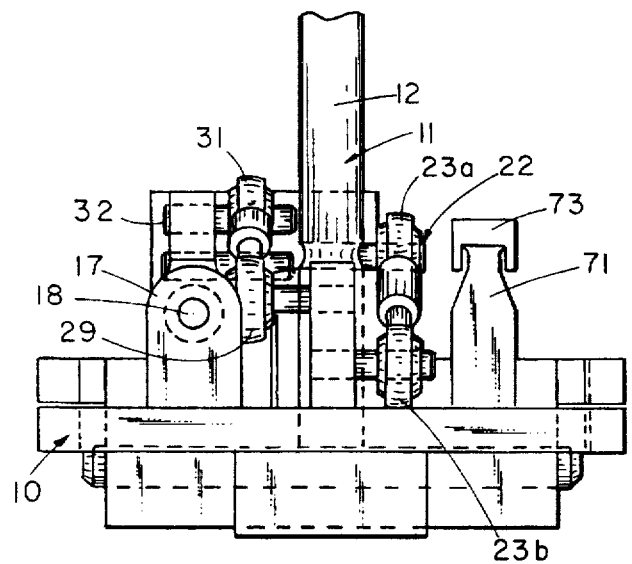
FIG. 9 is a rear elevational view of the shifter mechanism of FIGS. 7 and 8.

It should be understood that FIGS. 2–6 are substantially identical to the shifter mechanism of FIG. 1. The difference is in that the shape of the module 50a is slightly different from that of module 50 as disclosed in FIG. 1. Further, it should be clear that the mechanism as disclosed in FIGS. 7, 8, and 9 is substantially the same as disclosed in FIGS. 1–6. The only difference is that the module is shown located within a housing identified by reference numeral 50b.

Figure 10:
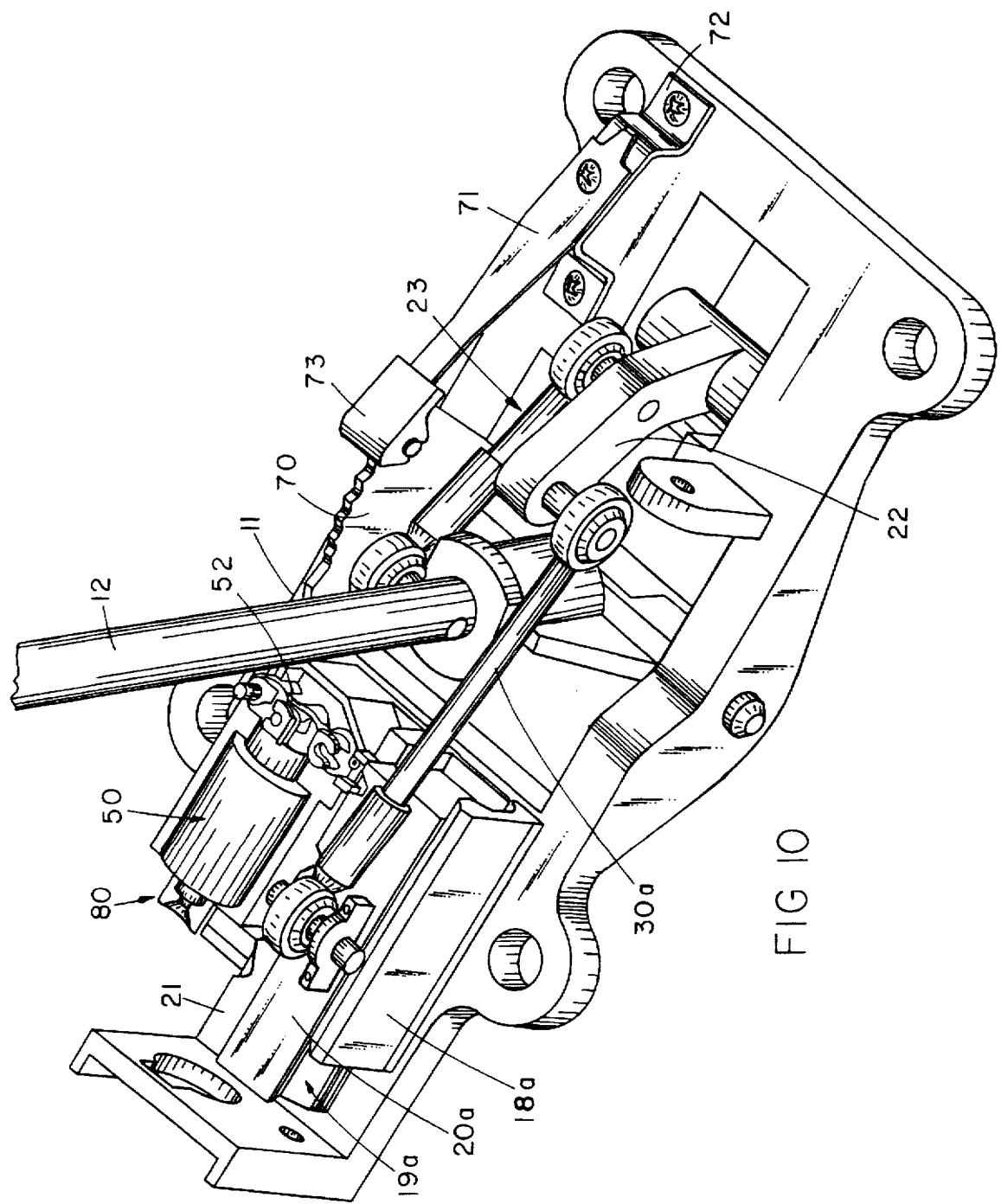
FIG. 10 is a top perspective view of a modified shifter mechanism in which the detent member is slidably mounted in a slide box.

Referring to FIG. 10, it disclosed a modification in which the primary difference is in the guide 18 for the detent assembly designated by the reference numeral 19a. This guide 18 for the detent assembly is a slide block 18a having a channel 18b in which block 20a is slidably mounted. As disclosed, the connecting rod 30a is pivotally connected to the detent assembly 19a which includes block 20a and detent member 21 which can be one piece or integrally connected elements. FIG. 10 discloses the subassembly 80 shown in greater detail in FIG. 11. Subassembly 80 includes the module 50a, the slide block 18a and detent assembly 19a. Subassembly 80 has a decided advantage for use on shifters having different throws for different shifting transmissions. Substantially the entire subassembly can be used on different shifting assemblies requiring only a change in the position of the various notches for "PARK," "REVERSE," "NEUTRAL," and the drive positions. It should be understood that the detent assembly 19a can include the integral parts 20a and 21 or they can be separate parts secured together in one way or another.

Figure 11:
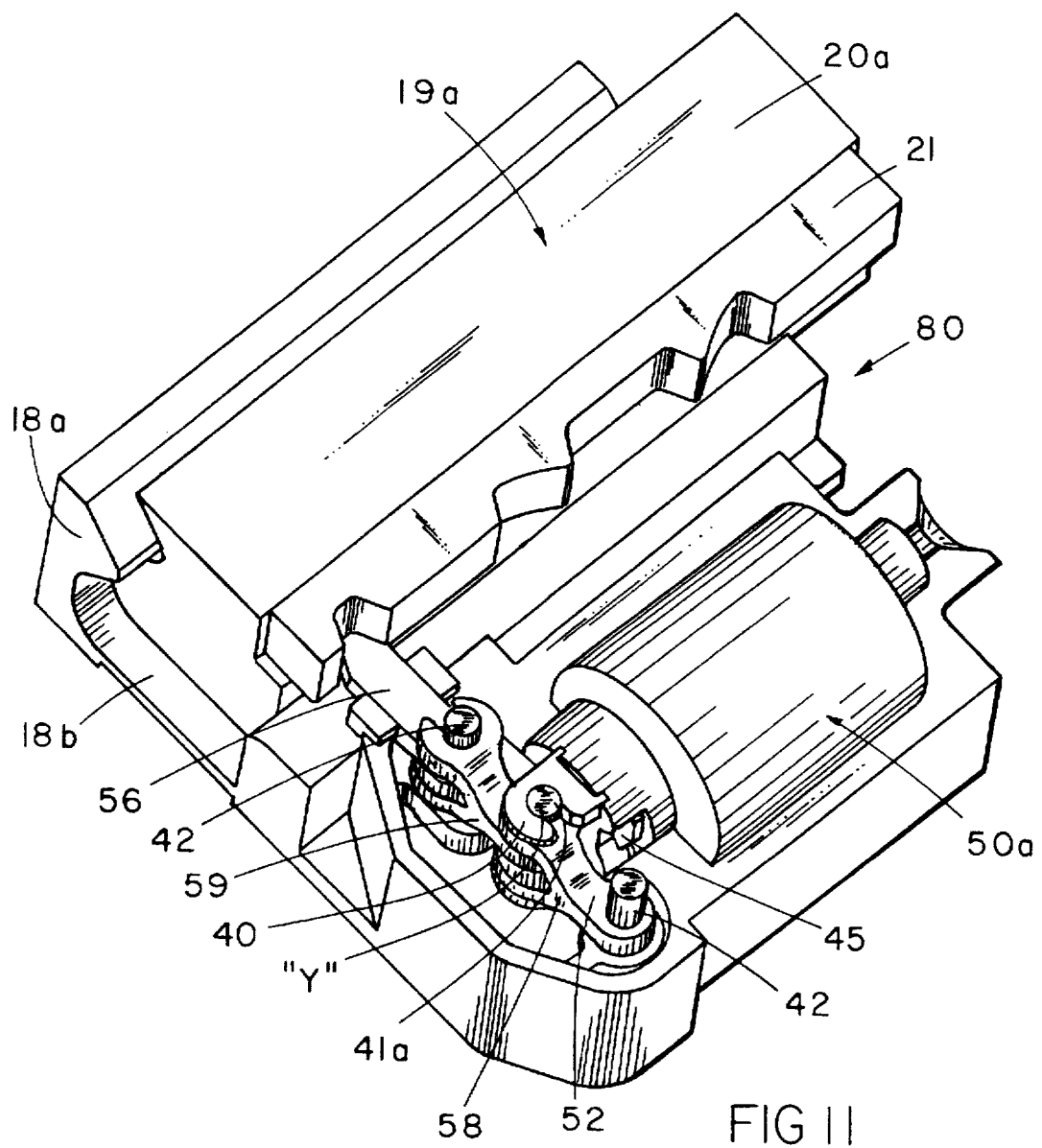
FIG. 11 is a partial side, top perspective view disclosing a subassembly of the shifter mechanism disclosed in FIG. 10.

It should be understood that one aspect of this invention is the subassembly as disclosed in FIG. 11 wherein a slide block 18a is integrally connected to the housing for the module 50a. It is preferred that the slide block 18a and the housing for the module 50a be molded as one piece so that it can be mounted on different shifter assemblies.

Figure 12:
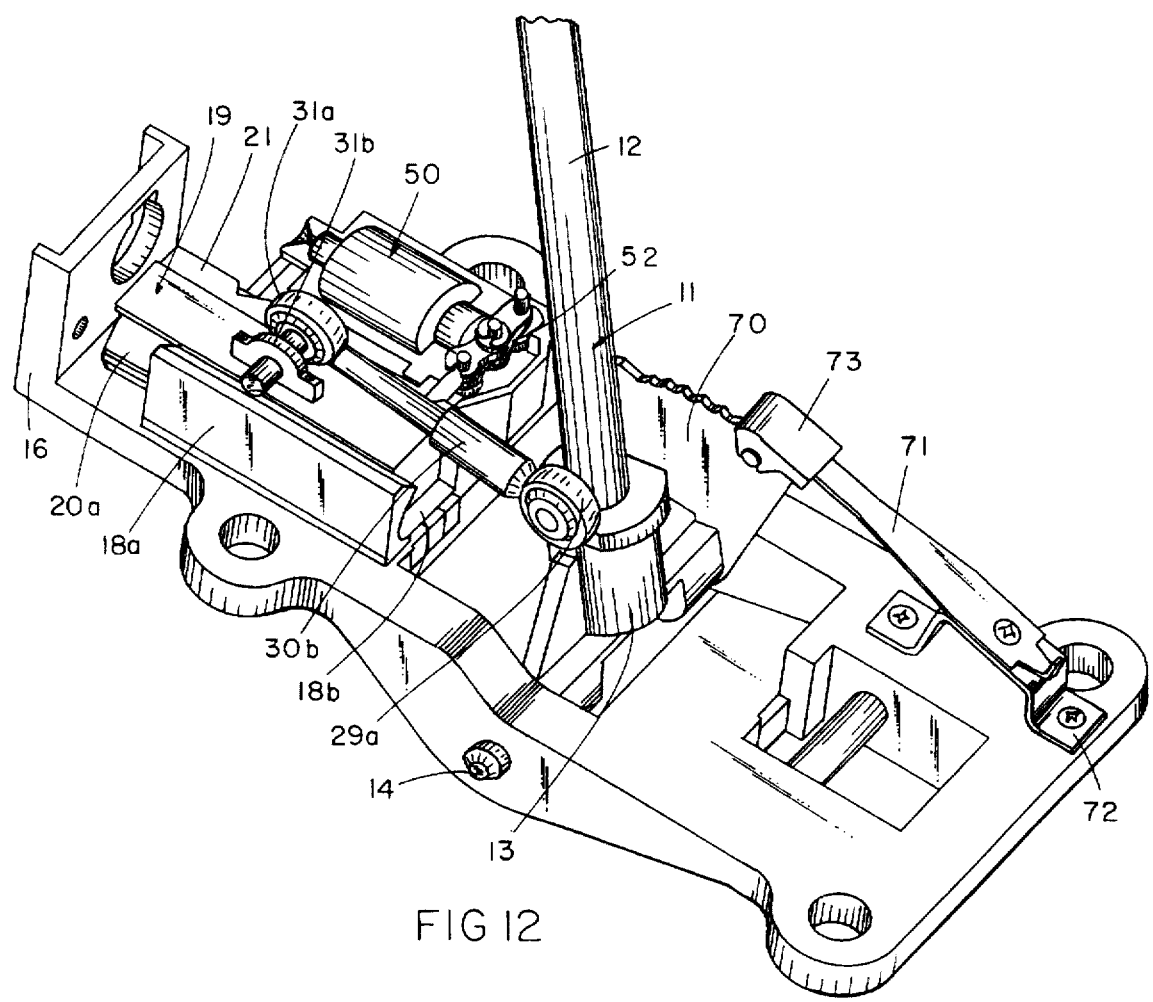
FIG. 12 is a side, top perspective view similar to that of FIG. 11 but disclosing the design of a shift lever mechanism which is different in providing a shift lever for transmitting a shorter throw to the detent member, such design being specially designed for controlling transmissions with electronic signals.

FIG. 12 shows another concept in which the stroke multiplier assembly 22 of FIGS. 1–11 is eliminated and connecting rod 30b is directly connected to the shift lever assembly 11 and the detent assembly 19a. Such connection is accomplished by the end 29a being pivotally connected to a shift lever assembly by the pin 29b and the end 31a being pivotally connected to the detent assembly 20a by the pin 31b. This arrangement of FIG. 12 provides for a very short stroke of the detent assembly and is especially useful for generating different electrical signals for each gear position of the transmission so as to control the shifting of transmission by electronic means rather than by connecting the transmission to the movable detent assembly 19 by a cable or rod 33 as disclosed in FIGS. 1–11.

Figure 16:
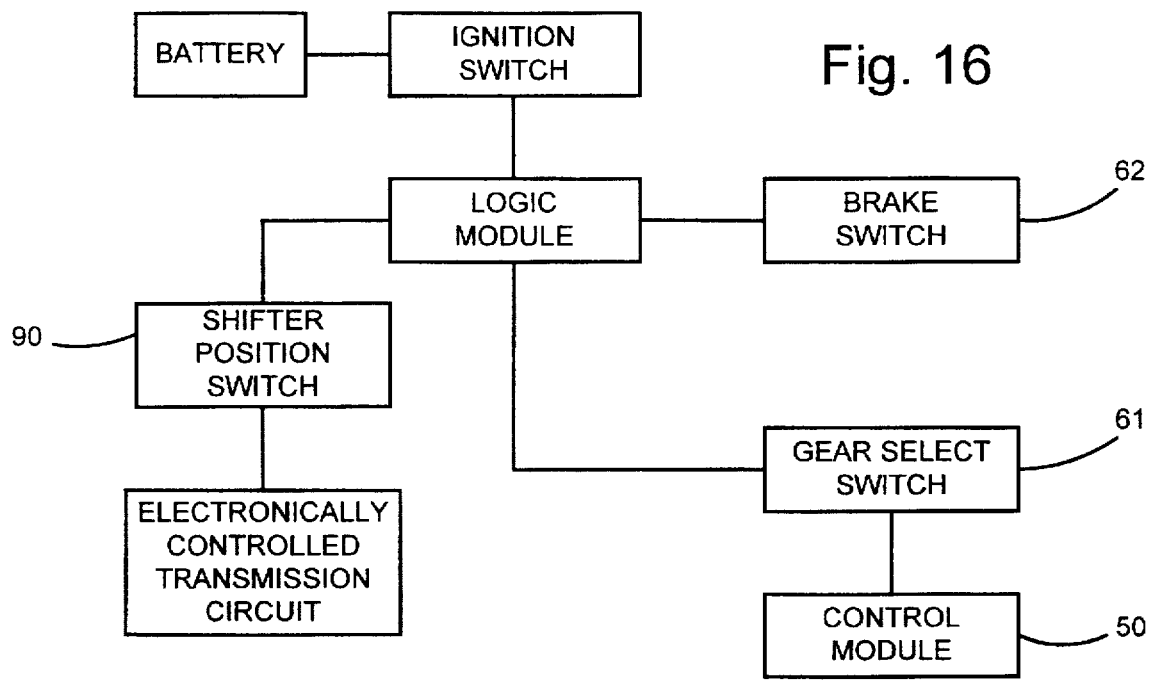
FIG. 16 is a circuit diagram illustrating a circuit for controlling an electronically controlled transmission utilizing the shifter mechanism of FIG. 12.

FIGS. 17–21 discloses a shifter position switch assembly comprising detent assembly 19a mounted as disclosed above in relation to the module 50 and locking element 56. Detent assembly 19a includes the detent member 21, block 20a and a switch pack 90 which controls the "Shifter Position Switch" of FIG. 16. Block 20a includes a series of small indentations 91 on one of its surfaces. These indentations are provided for three switches 90a, 90b, 90c mounted in line with each other in the switch pack 90 to determine which position the detent assembly is in. As the detent assembly 19a moves from one gear position to the other, the indentations cause different combinations of the switches to be opened or closed. As a result, as the detent assembly 19a is moved by the shift lever assembly 11 upon pivoting of the shift lever 12, i.e. so as to move from gear position to gear position, different signals are generated by switch pack 90 to produce signals in the "Shifter Position Switch" which signals are transmitted to the circuit of the "Electronically Controlled Transmission Circuit" of the electronic circuit of FIG. 16. Thus switch pack 90 generates signals which control the electronic control for the transmission. It is obvious that more than three switches can be arranged if more combinations of switches are needed.

FIG. 22 shows another embodiment of my invention which is identical to the embodiments of FIGS. 1–9 except the module 50c is a solenoid without a mechanical advantage such as the toggle linkage disclosed in FIGS. 1–9. It is to be understood that within the broadest aspect of this invention any workable means for actuating locking member 56 in "PARK" can be utilized.

Having described our invention, it should become obvious that we have provided an extremely low profile park/lock shifter by providing a relatively low profile movable detent member movable with the movement of the shifting lever. Further, we have eliminated the conventional pawl which is mechanically actuated by a button or lever mounted on the handle of the shifter. Instead we have utilized a module having a locking member as a means for directly locking the shifter in the "PARK" position. Many other advantages of this invention are evident from the above description.

The embodiments of the invention in which an exclusive property or privilege is claimed are defined as follows:

1. A vehicle shifting mechanism comprising a shift lever movable to different gear shifting positions and including a detent member having a plurality of notches including a "PARK" notch, each notch representing one of said gear positions, said "PARK" notch representing the "PARK" position;

a locking member for separately engaging each of said notches to determine the gear position of said shift lever, said locking member locking said shift lever in "PARK" position when engaging said "PARK" notch;
an actuator for actuating said locking member to locked and unlocked positions;
said detent member being movable with said shift lever.

2. The vehicle shifting mechanism of claim 1 in which said detent member is movable in a linear direction in response to movement of said shift lever.

3. The vehicle shifting mechanism of claim 1 in which said locking member is a part of an electrical control module movable between a locked position and an unlocked position, said control module being controlled by a driver applying the brakes of said vehicle whereby when said brakes are not applied said locking member is urged to said locked position and when said brakes are applied, said locking member is urged to unlocked position.

4. The vehicle shifting mechanism of claim 3 in which said control module includes an electrical coil and said locking member is movable in response to energization of said coil.

5. The vehicle shifting mechanism of claim 4 in which said control module includes an actuator member provided for moving said locking member to release said locking member from locked position in said "PARK" notch, and said actuator member is operatively connected to said locking member through a mechanical advantage mechanism.

6. The vehicle shifting mechanism of claim 5 in which said mechanical advantage mechanism is a toggle joint.

7. The vehicle shifting mechanism of claim 3 in which said control module is arranged to lay in a horizontal position to provide a low profile shifter.

8. The vehicle shifting mechanism of claim 2 in which said detent member is elongated and arranged to lay and move in a horizontal position to provide a low profile shifter.

9. The vehicle shifting mechanism of claim 7 in which said detent member is elongated and arranged to lay in a horizontal position and is linearly movable relative to said control module so as to provide a low profile shifter.

10. The vehicle shifting mechanism of claim 3 in which said shift lever also includes a switch for controlling said control module whereby in addition to the requirement for the brakes to be applied for urging said locking member to unlocked position, said switch is required to be actuated by the operator of said vehicle for urging said locking member to unlocked position.

11. The vehicle shifting mechanism of claim 1 in which a stroke multiplier linkage is connected between said shift lever and said detent member to multiply the pivotal movement of the shift lever as translated to said detent member so as to meet the stroke requirements of a transmission.

12. The vehicle shifting mechanism of claim 2 in which said detent member is slidable on a rod.

13. The vehicle shifting mechanism of claim 2 in which said detent member is slidable on a slide block.

14. The vehicle shifting mechanism of claim 11 in which said stroke multiplier linkage includes said shift lever pivotally mounted on a base about a first axis; an arm pivotally mounted on said base about a second axis parallel to and spaced a distance from said first axis; a first link pivoted at one of its ends to said shift lever and at the other of said ends to said arm; a second link pivoted at one end to said arm and at its other end to said detent member.

15. The vehicle shifting mechanism of claim 1 in which the different gear positions of said detent member generates different electrical signals for controlling the operation of an electronically controlled transmission.

16. The vehicle shifting mechanism of claim 8 in which a link member is pivotally connected directly between said shift lever and said detent member; said detent member having associated therewith electrical means responsive to the movement of said detent means for generating different electrical signals depending upon the movement of said detent member for controlling the operation of an electronically controlled transmission.

17. The shifter mechanism of claim 16 in which said electrical means comprises a switch pack including a series of switches spaced laterally of said linear direction; said detent member having movable therewith means for opening or closing different combinations of said switches thereby generating said different electrical signals.

18. The vehicle shifting mechanism of claim 9 in which the different gear positions of said detent member generates different electrical signals for controlling the operation of an electronically controlled transmission.

19. The vehicle shifting mechanism of claim 2 in which said detent member is slidable on a slide block.

20. The vehicle shifting mechanism of claim 1 in which the different gear positions of said detent member generates different electrical signals for controlling the operation of an electronically controlled transmission.

21. The vehicle shifting mechanism of claim 1 in which at least one of said notches represented by at least one gear position of said shifter lever requires actuation of said locking member to unlocked position after said shift lever is shifted out of "PARK"; said shift lever including a switch to be actuated by the operator of the vehicle for causing said actuator to actuate said locking member to unlocked position for permitting movement of said shift lever to said one gear position.

22. A sub-combination for use in a shifter mechanism for a vehicle comprising a shift lever and a detent member having a plurality of notches defining gear positions including a "PARK" notch each notch representing one of said gear positions, said "PARK" notch representing the "PARK" position;

a locking member movable along one line for separately engaging each of said notches to determine the gear position of said shifter mechanism, said locking member locking said shift lever in "PARK" position when engaging said "PARK" notch; an actuator for actuating said locking member in said one line to locked and unlocked positions;

said detent member being movable relative to said line of movement of said locking member whereby the movement of said detent member permits said locking member to separately engage each of said notches.

23. The sub-combination of claim 22 in which said detent member is movable in a linear direction.

24. The sub-combination of claim 22 in which said locking member is a part of an electrical control module movable between a locked position and an unlocked position.

25. The sub-combination of claim 24 in which said control module includes an electrical coil and said locking member is movable in response to energization of said coil.

26. The sub-combination of claim 23 in which said detent member is elongated and arranged to lay and move in a horizontal position to provide a low profile shifter.

27. The sub-combination of claim 24 in which said control module is arranged to lay in a horizontal position to provide a low profile shifter.

28. The sub-combination of claim 27 in which said detent member is elongated and arranged to lay in a horizontal position and is linearly movable relative to said control module so as to provide a low profile shifter.

29. The sub-combination of claim 23 in which said detent member is slidable on a rod.

30. The sub-combination of claim 23 in which said detent member is slidable on a slide block.

31. A sub-combination for use in a shifter mechanism for a vehicle comprising a detent member having a plurality of notches including a "PARK" notch, each notch representing one of said gear positions, said "PARK" notch representing the "PARK" position;

a locking member;

an electronically operated actuator for actuating said locking member along only one line relative to said actuator, said locking member provided for separately engaging each of said notches to determine the gear position of said shifting mechanism; and one of said detent member and said actuator being movable relative to the other whereby said locking member is permitted to separately engage each of said notches as said locking member is actuated along said one line and said one of said detent member and said actuator are moved relative to each other.

* * * * *